United States Patent
Chung (10) Patent No.: US 7,039,326 B1
(45) Date of Patent: May 2, 2006

(54) INFRARED COMMUNICATION SYSTEM UTILIZING RECEIVER WITH MULTIPLE PHOTO-SENSORS

(75) Inventor: Randall M. Chung, Laguna Niguel, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 09/408,198

(22) Filed: Sep. 29, 1999

(51) Int. Cl.
*H04B 10/06* (2006.01)

(52) U.S. Cl. .................. 398/202; 250/208.2; 398/208; 398/212

(58) Field of Classification Search ................ 359/189, 359/193, 194, 188, 154, 157, 159, 155, 142, 359/146, 148; 348/734, 169, 211.1, 211.2; 398/202, 208, 212; 250/208.2–208.6
See application file for complete search history.

(56) References Cited

U.S. PATENT DOCUMENTS

| | | | |
|---|---|---|---|
| 3,987,297 A * | 10/1976 | Brienza et al. | 250/208.3 |
| 5,103,108 A * | 4/1992 | Crimmins | 250/338.1 |
| 5,355,242 A * | 10/1994 | Eastmond et al. | 250/214 A |
| 5,557,443 A * | 9/1996 | Nakamura et al. | 348/169 |

OTHER PUBLICATIONS

Ersmarker and Nilsson, "Tjoreven—Wireless computer communication in local networks—Master's Thesis," Feb. 18, 1998.
Williams et al., "Infrared Data Association, Serial Infrared Link Access Protocol (IrLAP)," Infrared Data Association[SM], Version 1.1, Jun. 16, 1996.

* cited by examiner

*Primary Examiner*—Thomas Mullen
(74) *Attorney, Agent, or Firm*—Farjami & Farjami LLP (57) ABSTRACT

A communication system including an infrared receiver that receives optical infrared signals. The infrared receiver utilizes an array of photo-sensors for detecting optical infrared signals within a solid angle. Each photo-sensor, however, detects optical infrared signals in only a predetermined portion of the solid angle. On detecting optical infrared signals, each photo-sensor converts and forwards a corresponding electrical signal to a filter circuit that selectively determines whether the signal meets a predetermined criteria such as a frequency threshold. The filter circuit or other processing circuitry is thereby able to identify photo-sensor(s) providing an optimal infrared communication link. The infrared receiver may include an optical system comprising a lens assembly that directs the optical infrared signals towards the array of photo-sensors. In one embodiment, the lens assembly employs a diffused lens having an imperfect focus to facilitate the detection of optical infrared signals emanating from transmitters that have a relatively small solid angle.

18 Claims, 5 Drawing Sheets

INFRARED COMMUNICATION SYSTEM UTILIZING RECEIVER WITH MULTIPLE PHOTO-SENSORS

BACKGROUND

1. Technical Field

The present invention relates to the field of infrared communications. More specifically, the invention relates to an infrared communication system including a receiver having multiple photo-sensors.

2. Description of Related Art

A conventional infrared communication system utilizes a wireless optical infrared communication link employing a transmitter to emit optical infrared signals that are received by an infrared receiver. A conventional infrared receiver typically employs a single photo-sensor having an "acceptance cone" to detect the emitted infrared signals. The acceptance cone typically has a wide angle of view. This feature permits the reception of infrared signals even when the transmitter and the receiver are misaligned, thus enabling a broader area of reception.

Several optical link protocol specifications have been developed over the past several years with regards to infrared data communications. The Infrared Data Association (IrDA) has issued the Serial Infrared Link Access Protocol (IrLAP), which defines serial infrared links capable of supporting an optical link with a range of at least one meter. An IrDA serial infrared interface must be able to operate at a minimum signaling rate of 9.6 kb/sec, up to a rate of 4 Mb/s wherein the nominal pulse duration is 125 nsec.

Conventional IR receivers having a wide angle acceptance cone, such as those implemented in accordance with the IrLAP specification, typically sense incoming infrared light within a specified solid angle. In addition, IR receivers also sense light emanating from ambient sources, including electromagnetic waves, sunlight, incandescent lighting and fluorescent lighting. These ambient sources interfere with true optical signals, thus lowering the signal to noise ratio of the communication system. These conditions limit not only the signal to noise ratio, but also reduce the optical link range of the communication system. In addition to the foregoing problems, conventional infrared communication systems typically operate at relatively low speeds. Furthermore, because conventional IR receivers have low sensitivity, conventional IR transmitters utilize transistors having high power output, thus resulting in relatively high power consumption.

Further disadvantages of the related art will become apparent to one skilled in the art through comparison of the drawings and specification which follow.

SUMMARY OF THE INVENTION

Various aspects of the present invention can be found in a communication system that utilizes optical infrared signals. The communication system includes an infrared receiver that receives the optical infrared signals. The infrared receiver utilizes an array of photo-sensors for detecting optical infrared signals within a solid angle. Each photo-sensor, however, detects optical infrared signals in only a predetermined portion of the solid angle. On detecting the optical infrared signals, each photo-sensor converts and forwards a corresponding electrical signal to a filter circuit that selectively determines whether the signal meets a predetermined criteria such as a frequency threshold. The filter circuit or other processing circuitry is thereby able to identify a photo-sensor(s) providing the optimal infrared link.

In some embodiments, an optical system for receiving the optical infrared signals is included in the infrared receiver. The optical system comprises a lens assembly that focuses the optical infrared signals toward the array of photo-sensors. The lens assembly may employ a lens having an imperfect focus to facilitate the detection of optical infrared signals emanating from transmitters that have a relatively small solid angle.

In other embodiments, each photo-sensor within the infrared receiver is provided with a noise suppression circuit. In addition, the array of photo-sensors within the transceiver may be one dimensional or multidimensional.

Further aspects of the present invention may be found in a method used by a photo-sensor array having a plurality of photo-sensors to detect the optical infrared signals within a solid angle. The photo-sensor array receives and detects optical infrared signals only within a predetermined portion of a solid angle. Other aspects of the present invention may be found in an infrared receiver that filters converted electrical signals based on a predetermined frequency or power threshold.

The present invention provides high-speed communication that may be IrDA compliant. Further, the present invention may find use in PCs, handheld computers, cell phones, printers, personal digital assistants or other devices having ports. The signal to noise ratio of the present invention improves upon prior solutions, and provides accurate optical communications even when two optical interface ports are not perfectly aligned. Advantageously, the present invention provides an infrared receiver having a wide angle of view with an improved ability to reject false signals.

Other aspects of the present invention will become apparent with further reference to the drawings and specification, which follow.

DETAILED DESCRIPTION OF DRAWINGS

Figure 1:
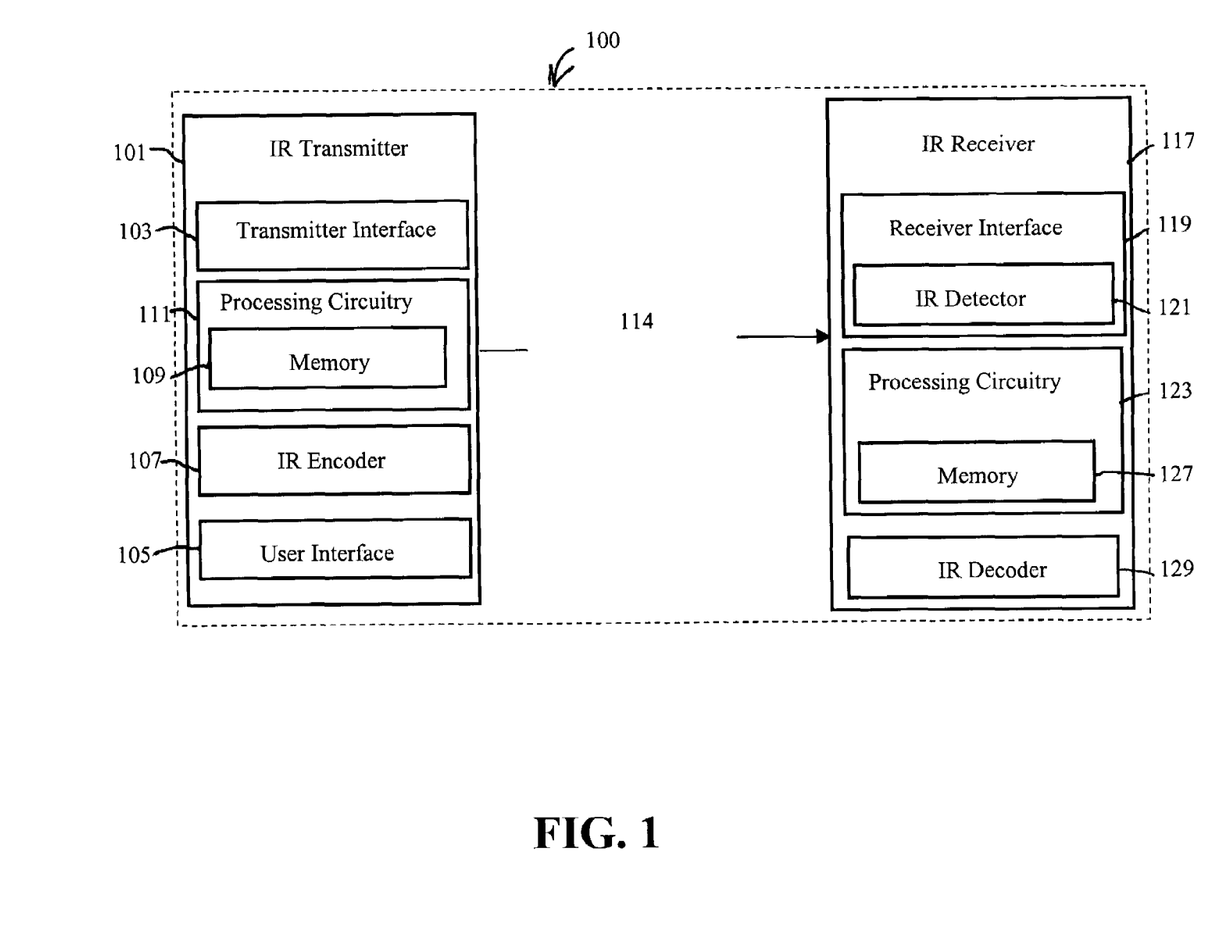
FIG. 1 is a schematic diagram of an exemplary infrared communication system having an IR transmitter and an IR receiver according to the present invention, and illustrating the transmission of data through an enhanced optical communication link.
Figure 3:
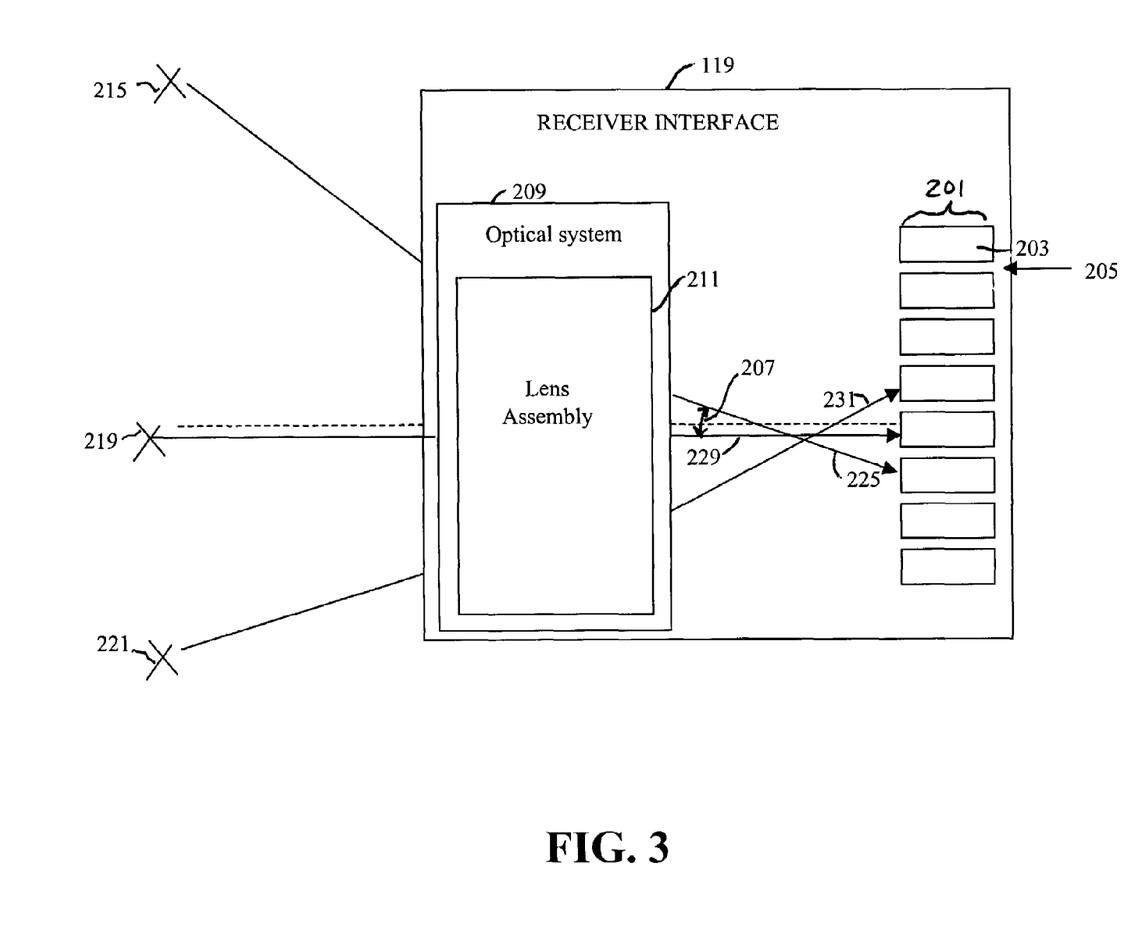
FIG. 3 is an exemplary embodiment of the communication system of FIG. 1 illustrating the detection of optical infrared signals by an array of photo-sensors according to the present invention.

FIG. 1 is an exemplary schematic diagram of an infrared communication system having both an IR transmitter and receiver according to the present invention, and illustrating the transmission of data through an enhanced optical communication link. More specifically, data is transmitted via an enhanced optical communication link 114 to an IR receiver 117 incorporating an array of photo-sensors 201 (FIG. 3).

A user wishing to utilize a communication system 100 may initiate the transfer of data through a user interface 105. The data is typically comprises strings of binary characters, and may be stored within memory 109 prior to transmission. Responding to the user interface 105, a processing circuitry 111 directs data to an IR encoder 107 that serially encodes the data and outputs an encoded binary stream. The encoded binary stream is then forwarded to a transmitter interface 103. The processing circuitry 111 next directs the transmitter interface 103 to initiate optical signaling. Thereafter, the transmitter interface 103 transmits the encoded binary stream for reception by the IR receiver 117.

An IR detector unit 121 within a receiver interface 119 detects the encoded binary stream and outputs corresponding electrical signals. Advantageously, the IR detector unit 121 comprises multiple photo-sensors (such as those referenced in FIG. 3) that enables data transmission via the enhanced optical communication link 114. A processing circuit 123 directs the received electrical signals to the IR decoder 129 for decoding. In response, the IR decoder 129 decodes the electrical signals and outputs the original binary character stream. Although various schemes exist, the present embodiment is referenced with regards to serial encoding for data transmission.

The communication system 100 is capable of complying with various standards such as the *IrDA Serial version* 1.2 *Infrared Physical Layer Specification*. In particular, the IR transmitter 101 emits a Serial Infrared interaction Pulse (SIP) at least once every 500 ms to quiet systems with lower signaling rates (115.2 kb/s and lower). The SIP stimulates a start pulse that enables the lower signaling system to listen for at least 500 ms. Data may be transmitted through the optical communication link 114 at a signaling rate of 4.0 Mb/s as per IrDA specifications, or at even higher signaling rates.

Each component within the communication system 100 is not limited as referenced but may encompass other embodiments without departing from the spirit of the present disclosure. The user interface 105 within the IR transmitter 101 may comprise various manual or voice input mechanisms, including a touch pad, keypad, independent function buttons, voice recognition software, microphones, etc. Processing circuitry 111 and 123 co-ordinate and synchronize various tasks relating to the transmission and receipt of data, and may be external to the communication system 100 or embodied within a specific component. Encoding may be performed, for example, by either a hardware or software controller. The transmitter interface 103 typically includes a driver and a Light Emitting Diode (LED).

As set forth in greater detail below, the receive interface 119 features an IR detector unit 121 that advantageously employs a photo-sensor array having at least two photo-detectors for detecting optical signals. In addition, a plurality of photo-sensor arrays may be employed.

The IR encoder 107 may employ various encoding schemes, including a Pulse Position Modulation (PPM) encoding scheme. PPM encoding is achieved by defining a data symbol duration ($D_t$) and subdividing $D_t$ into a set of equal time slices called "chips." One of a plurality of possible bit combinations is represented by each chip position within a data symbol. Each chip has a duration of $C_t$ given by the formula:

$$C_t = D_t/\text{Base},$$

where "Base" equals the chips or number of pulse positions in each data symbol. The Base for IrDA PPM 4.0 Mb/s systems is defined as four, and the resulting modulation scheme is called "four pulse position modulation" (4PPM). Further details regarding 4PPM data encoding and signaling rate is specified at page 14 of the *IrDA Serial version* 1.2 *Infrared Physical Layer Specification* (IrDA reference).

Figure 2:
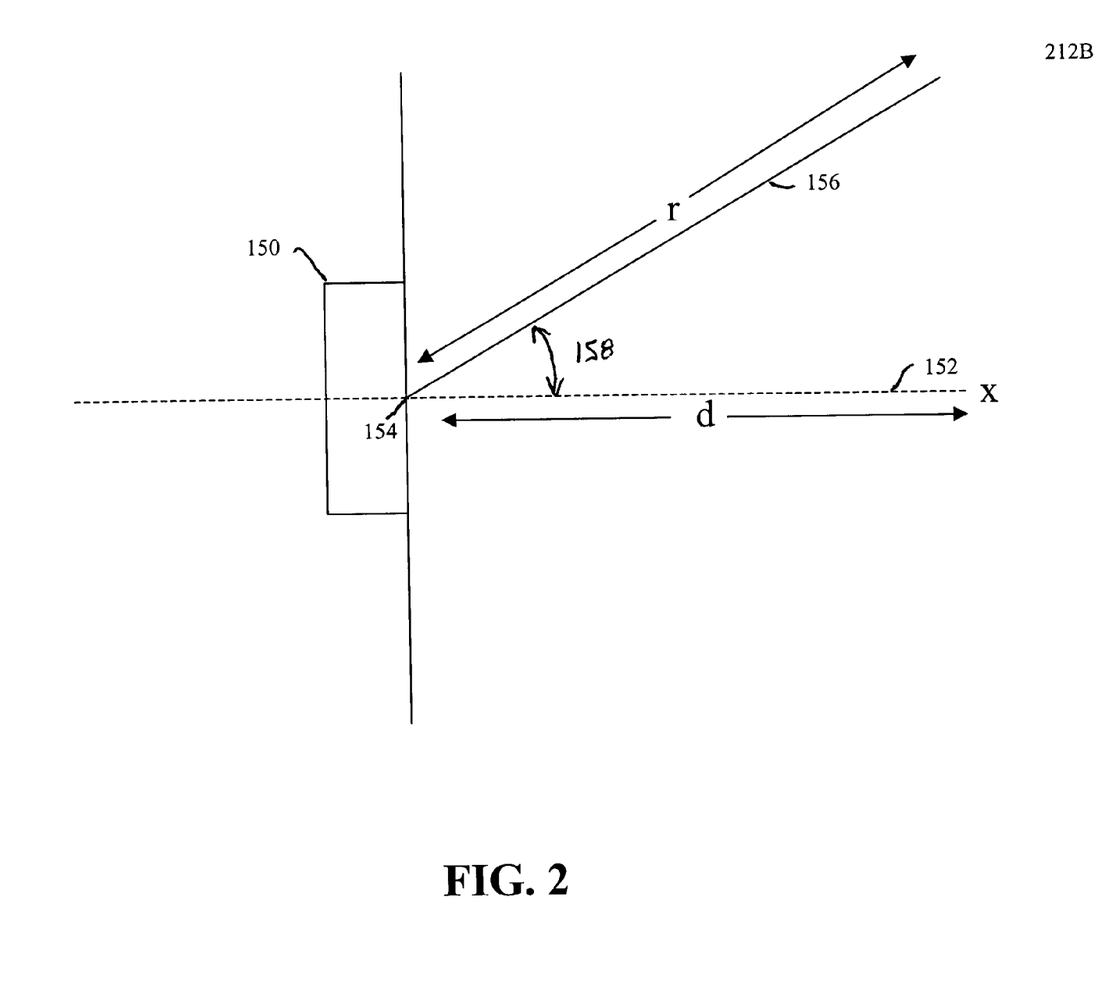
FIG. 2 is an exemplary diagram of an input interface optical port of an IR receiver.

FIG. 2 is an exemplary diagram of an input interface optical port 150 of an IR receiver 117 capable of being implemented in accordance with the present invention. The illustration is provided for definitional purposes. An optical axis 152 of the port 150 is chosen to be normal to the surface that contains the optical port 150. A center 154 of the optical port 150 is usually used as the reference point, and is located where the optical axis 152 exits the port 150. Angular range of an optical port is defined with reference to a spherical coordinate system having a radial distance R, angular coordinates that are relative to a defined axis, and distance D along the X axis. The spherical coordinate system axis is normal to the emitting or receiving surface of the optical port 150 and intersects the optical port at its center 154. Thus, the angular range of an optical port 150 as illustrated is a cone whose apex is at the intersection of the optical axis 152 and the perimeter surface of the optical port 150.

Each optical link generally has to satisfy certain predetermined parameters, usually defined in a standard. The half-angle 158 value is defined as the half of a solid (3-dimensional) angle of the cone whose apex is at the center 154 of the optical port 150 and whose axis is normal to the surface of the port 150. The half-angle 158 value is determined by the minimum angle from the normal to the surface where the minimum allowable intensity and angular range is encountered. Therefore, in FIG. 2, a half-angle 158 value is defined for an angle with an apex in the center 154, as the minimum angle between the optical axis 152 and a surface, defined in FIG. 2 by a line 156, where the minimum allowable intensity in angular range is encountered.

Minimum allowable intensity in angular range, defined by power per unit solid angle (milliWatts or microWatts per steradian), is the minimum allowable source intensity within the defined angular range. Maximum allowable intensity in angular range, defined by power per unit solid angle (milliWatts per steradian Sr), is the maximum allowable source intensity within the defined angular range. If there is optical port asymmetry, as long as the maximum half-angle of the distribution is not greater than the allowable half-angle range maximum, and the minimum half-angle of the distribution is not less than the allowable half-angle minimum, the half-angle range specification is met.

Signaling rate (also called the bit rate and presented in kilobits or megabits per second) is the rate at which data and protocol information is sent or received. Peak wavelength (measured in nanometers) is the wavelength at which the optical output source (IR Transmitter) intensity is at a maximum. Maximum irradiance in angular range, defined by power per unit area in milliWatts per square centimeter, is the optical power delivered to the IR detector 121 by a source operating at the maximum allowable intensity in angular range at minimum link lengths, which does not cause receiver overdrive distortion and possible related link errors. Minimum irradiance in angular range is defined by power per unit area in milliWatts or microWatts per square centimeter. The IR receiver 117 must not have an error when it operates at the minimum allowable intensity in the angular range into the minimum half-angle range at the maximum link lengths. The IR receiver 117 must also be able to operate at the minimum irradiance in angular range from zero angular degrees to at least the minimum angular range value.

Typical optical lengths operate at this alignment angle from zero to at least 15 degrees, with no maximum limit imposed on the misalignment half-angle for the active interface ports. Optimally, the intensity must be less than or equal to the predefined maximum allowable intensity in angular range, in the angular region less than or equal to 30 degrees, and less than or equal to the predefined minimum allowable intensity in angular range, in the angular region greater than 30 degrees. The intensity must be greater than or equal to the predefined minimum allowable intensity in angular range, in the angular region less than or equal to 15 degrees.

Although the IrDA IrLPA protocol defines serial infrared links would should be able to support the length between the two nodes of at least one meter, the conventional low cost optical electric technology optical length cannot obtain accurate free space optical communications at four Mbps rate at that distance and are limited to a range of about one foot. The range at that rate is limited by low sensitivity and low signal-to-noise ratio of the IR Receiver and by the limited amount of optical power of the transmitter. Typical IR Receivers have a single photo sensor in their active input interface optical port detector which senses all incoming IR light which is in a specified solid angle. As noted above, some of the incoming light may come from the accompanying IR Transmitter, but some light may come from ambient sources, such as sunlight or light bulbs. The undesired light will lower the signal-to-noise ratio of the IR Receiver that is used for optical communication.

The IrDA IrLAP link power measurement can be made on a single pulse as a peak optical power level or by averaging a sequence of optical signal pulses in converting to peak levels. It should be noted that there is no size constraint for the detector in the IrDA IrLAP receiver. Typically, spatial resolution is measured at $2 \times 10^{-5}$ steradians, which may be achieved with a detector having an effective area of 0.2 cm$^2$ (5 mm diameter) at 1 meter distance, which subtends a half-angle of 0.14 degrees. The size of the photo detector should be such to avoid near field optical effects, but enough to receive a robust signal. The intensity is measured by measuring optical power, distance, and angle from a reference point.

Optical powers converted to intensity by the formula:

Intensity (mW/Sr)=[Power (mW)/Detector Solid Angle (Sr)].

Detector Solid Angle in steradians is given by the formula:

Detector Solid Angle (Sr)=2π[1−COS (half-angle)], where the half-angle is the half of the angle subtended by the detector, viewed from the reference point.

Detector Solid Angle can be approximated with the formula:

Detector Solid Angle (Sr)~[Area of Detector/$r^2$], where the variable "r" is the distance between the transmitter and the reference point.

An IR Receiver according to the present invention provides increased sensitivity and improved signal-to-noise ratios, thereby increasing the operating range in which accurate optical signals can be obtained and/or permitting use of transmitters with lower transmitter power abilities. An IR Receiver implemented in accordance with the invention may be manufactured using low cost optical technology, and is able to provide accurate free space optical communications at long lengths, even when two optical interface ports are not perfectly aligned.

FIG. 3 is an exemplary embodiment of the communication system of FIG. 1 illustrating the detection of optical infrared signals by an array of photo-sensors 201 according to the present invention. Specifically, the array of photo-sensors 201 within the receiver interface 119 detects infrared signals emitted from, for example, active infrared sources 215, 219, and 221.

The receiver interface 119 includes an optical system 209 that directs the emitted infrared signals along one or more optical paths 225, 229, 231, toward the array of photo-sensors 201. The infrared signals are then detected by the array of photo-sensors 201, which produce corresponding electrical signals.

In the disclosed embodiment, the optical system 209 includes a lens assembly 211 responsible for focusing the optical infrared signals toward the array of photo-sensors 201. The lens assembly 211 may be comprised of a material which is transparent to infrared light but blocks visible light, for example. In addition, the lens may be designed such that the lens focus is diffused, rather than sharp, enabling the detection of infrared signals from light sources having small solid angles (e.g., the point source transmitter). That is, without a lens having a diffused focus, infrared signals may fall on a narrow gap 205 between individual IR photo-sensors 203.

The array of photo-sensors 201 is a solid state image sensor such as a Charged Couple Device (CCD), or any other type of photo-sensor known to those skilled in the art. Further, the array of photo-sensors 201 may be either one dimensional or multi-dimensional as further described in conjunction with FIGS. 4A and 4B. Each IR photo-sensor 203 within the array of photo-sensors 201 is separated by a narrow gap 205, and is sensitive to a predetermined portion of a solid angle. Advantageously, because each separate IR photo-sensor 203 is sensitive to a portion of the total solid angle (twice the half angle 207), the determination of which IR photo-sensor 203 is receiving a valid signal allows the rejection of noise from the other IR photo-sensors 203.

In an alternate embodiment, each IR photo-sensor 203 is provided with a noise suppression circuit, a frequency threshold filter circuit, and power threshold circuitry that permits IR signals with insufficient transmission characteristics to be disregarded. Each of these functions may be implemented as part of the processing circuitry 123. The signals received from each IR photo-sensor 203 may be passed through a summing circuit prior to forwarding to an IR decoder 129.

Figure 5:
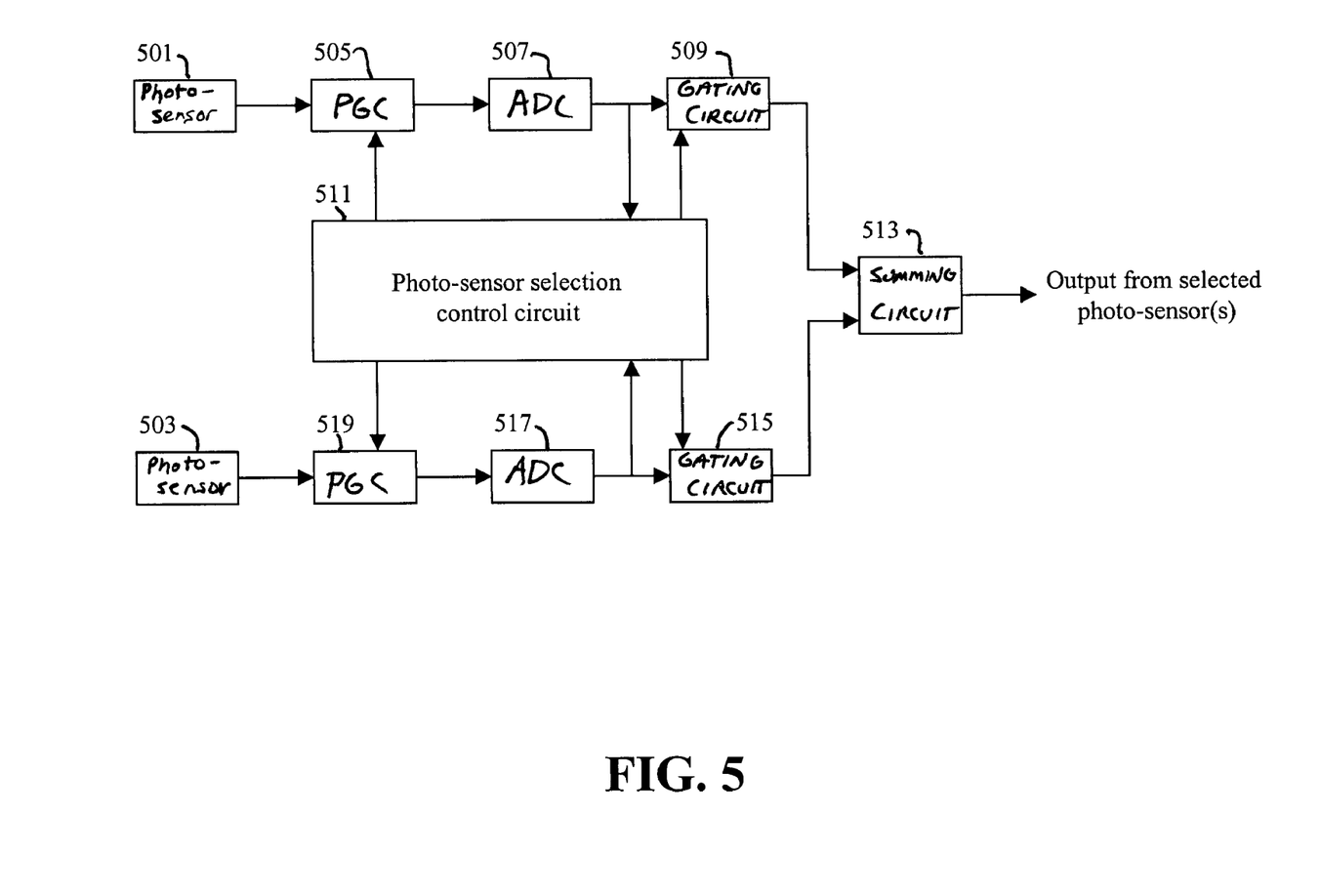
FIG. 5 is a schematic diagram providing exemplary details of the infrared communication system of FIG. 1.

FIG. 5 is a schematic diagram providing exemplary details of the infrared communication system of FIG. 1. The output signal from each photo-sensor 501, 503 is amplified by programmable gain circuits (PGC) 505 and 519, respectively. The amount of gain can be dynamically adjusted by a photo-sensor selection control circuit 511. After amplification, the photo-sensor signal is converted from an analog signal to a digital signal via an analog to digital converter 507 or 517. The photo-sensor selection control circuit 511 examines each digitized photo-sensor signal to determine if it meets the predetermined criteria for pulse width and pulse frequency. If the signal does not meet the predetermined criteria, then the signal is most likely noise and is gated via gating circuits 509 or 515 by setting it to zero. The final output signal comprises a summation of signals from one or more qualified photo-sensor signals. The summation process is performed by a summing circuit 513, thus removing spurious signals which would only contribute to the noise in the system.

The present embodiment requires relatively low power because of its increased sensitivity, further resulting in longer communication ranges. Further advantages of the present embodiment include the protection of each IR photo-sensor 203 from saturation that may result from optical power emitted from an adjacent IR source. This is because the irradiance level of each IR photo-sensor 203 within the array of photo-sensors 201 is reduced by a factor equal to the number of photo-sensors within the array. Moreover, the IR detector 121 of the present invention increases optical communication range without increasing IR transmitter power. The present embodiment is particularly applicable to serial infrared links, obtained with low cost optoelectronic technology, wherein the optical interfaces between transceivers need not be perfectly aligned.

The present embodiment may be configured to operate at a Minimum Intensity in Angular Range of 10 uW/cm². The Minimum Intensity in Angular Range is the power per unit area (milliWatts per square centimeter). An IR receiver meets the Bit Error Ratio (BER) when operating at the Minimum Intensity in Angular Range into the minimum Half-Angle Range at the maximum link length, as per IrDA specifications. The BER is the number of errors divided by the total number of bits. It is a probability, generally very small, and is often expressed as a negative power of 10 (e.g., $10^{-8}$). While no minimum intensity requirement exists, the Maximum Irradiance in Angular Range of the present embodiment is 500 mW/cm² where, Detector Solid Angle (Sr)=2 pi[1−cos (Half-Angle)]

Figure 4A:
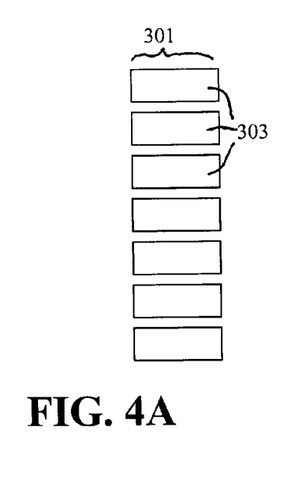
FIG. 4A is an exemplary embodiment of a photo-sensor array according to the present invention.

FIG. 4A is an exemplary embodiment of a photo-sensor array according to the present invention. More specifically, the configuration of a one dimensional photo-sensor array 301 for receiving optical infrared signals from a light source is illustrated.

A plurality of photo-sensors 303 are aligned within the photo-sensor array 301. The photo-sensors 303 may be horizontally or vertically aligned with respect to the center axis of optical system 209 (FIG. 3), for example. Each photo-sensor 303 receives light and outputs a corresponding electrical signal to a dedicated filter circuit, although a collective filter circuit may be employed.

There is no number or size constraint for the IR photo-sensors 303. A relatively high number of photo-sensors 303 may be employed. The size of the photo-sensor array 301 may, however, have an effective area of less than 0.2 cm² (5 mm diameter). This size should be small enough to avoid near field optical effects but enough to receive a robust signal. The resolution of spatial intensity variation should be as fine as the smallest detector.

Figure 4B:
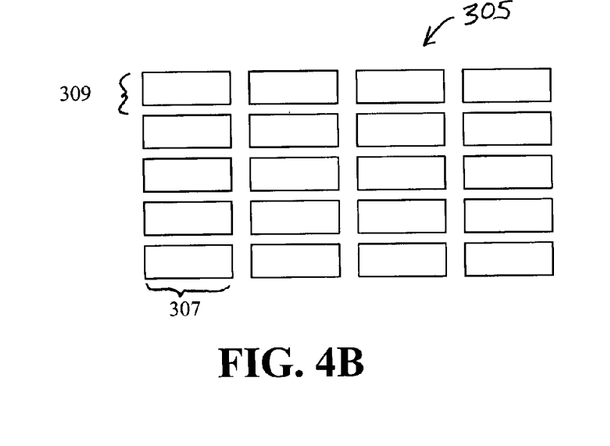
FIG. 4B is an alternate embodiment of an exemplary photo-sensor array according to the present invention.

FIG. 4B is an alternate embodiment of a photo-sensor array according to the present invention. More specifically, a two-dimensional photo-sensor array 305 that receives optical signals from a light source is illustrated. A first plurality of vertically arranged photo-sensors 307 is coupled with a second plurality of horizontally arranged photo-sensors 309. The present embodiment functions as previously referenced in FIG. 4A, and may permit a greater degree of misalignment between the IR receiver and transmitter.

The present invention could be used for any electronic product which uses a fast wireless IR interface, such as a printer, portable computer, personal digital assistant, electronic camera and the like. The optical interface IR detector of the present invention operates independent of the optical link technology and may transfer any type of digital data directly from one computer to another, from a computer to a peripheral, or from a peripheral to a peripheral, such as from a camera to a printer. The present invention, although applicable to any optical interface IR detector is believed to be especially applicable to optical link IR receivers which satisfy the IrLAP specification for half-duplex mode serial infrared links, operating at signaling weights from 9.6 Kb/sec to 4 Mbps or higher.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

What is claimed is:

1. A communication system for use with a transmitter that transmits optical infrared signals, the communication system comprising:
    an infrared receiver employing an array of at least two photo-sensors that combine to detect the optical infrared signals within a solid angle;
    each photo-sensor within the array of the at least two photo-sensors detects the optical infrared signals within a predetermined portion of the solid angle and generates an output signal; and
    a photo-sensor selection control circuit configured to receive the output signal of each photo-sensor within the array of the at least two photo-sensors and to suppress the output signal of each photo-sensor within the array of the at least two photo-sensors that fails to meet at least one of predetermined pulse width and pulse frequency thresholds.

2. The communication system of claim 1 wherein the infrared receiver further comprises:
    a lens assembly for focusing the optical infrared signals onto the array of the at least two photo-sensors.

3. The communication system of claim 2 wherein the lens assembly employs a lens having an imperfect focus.

4. The communication system of claim 1 further comprising:
    a filter circuitry coupled to each of the at least two photo-sensors, the filter circuitry filtering the optical infrared signals falling below a predetermined threshold frequency value.

5. The communication system of claim 4, further comprising:
    an output summing circuitry that receives and sums unfiltered optical infrared signals.

6. The communication system of claim 4 further comprising:
    a programmable gain circuitry coupled to each of the at least two photo-sensors that amplifies the output signal of each of the at least two photo-sensors.

7. The communication system of claim 6 wherein the programmable gain circuitry may dynamically adjust the amount of gain.

8. The communication system of claim 6, further comprising:
    an analog to digital converter circuitry coupled to the programmable gain circuitry for converting outputs of the programmable gain circuitry to digital signals.

9. The communication system of claim 1 wherein the array of the at least two photo-sensors is one dimensional.

10. The communication system of claim 1 wherein the array of the at least two photo-sensors is multi-dimensional.

11. The communication system of claim 1 operating in a half duplex serial mode with a range of at least one meter.

12. The communication system of claim 1 operable at the solid angle from zero to approximately thirty degrees.

13. A method for capturing optical infrared signals within a solid angle, the method comprising:
   providing a photo-sensor array having at least two photo-sensors;
   detecting, by each photo-sensor within the photo-sensor array, optical infrared signals within a predetermined portion of the solid angle;
   converting the optical infrared signals into corresponding electrical signals; and
   selectively outputting, using a signal selection circuitry coupled to the photo-sensor array, the corresponding electrical signals based on at least one of a pulse frequency threshold and a power threshold.

14. The method of claim 13, further comprising:
   providing a lens for directing the optical infrared signals to the photo-sensor array.

15. The method of claim 14, wherein the lens is a diffused lens having an imperfect focus.

16. An infrared receiver that detects optical infrared signals, the infrared receiver comprising:
   a photo-sensor array comprising a plurality of photo-sensors, each of the plurality of photo-sensors receiving optical infrared signals within a predetermined portion of a solid angle and converting received optical signals to electrical signals; and
   a signal selection circuitry coupled to the photo-sensor array, the signal selection circuitry selectively outputting corresponding electrical signals based on at least one of a pulse frequency threshold and a power threshold.

17. The infrared receiver of claim 16 further comprising an optical system arranged to direct optical infrared signals to the photo-sensor array.

18. The infrared receiver of claim 16 wherein the array of photo-sensors detects signals operating within a signaling rate range of 9.6 kb/s through 4 mb/s.

* * * * *